(12) United States Patent
Bittner et al.

(10) Patent No.: US 10,295,039 B2
(45) Date of Patent: May 21, 2019

(54) CONVEX GEAR TOOTH EDGE BREAK

(71) Applicant: Sikorsky Aircraft Corporation, Stratford, CT (US)

(72) Inventors: Edward H. Bittner, Madison, CT (US); Bruce D. Hansen, Shelton, CT (US); Christopher John Mussel, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 74 days.

(21) Appl. No.: 15/412,928

(22) Filed: Jan. 23, 2017

(65) Prior Publication Data
US 2017/0227107 A1    Aug. 10, 2017

Related U.S. Application Data

(60) Provisional application No. 62/291,469, filed on Feb. 4, 2016.

(51) Int. Cl.
*B23F 5/02* (2006.01)
*F16H 55/08* (2006.01)
*F16H 55/17* (2006.01)
*B23H 9/00* (2006.01)

(52) U.S. Cl.
CPC .......... *F16H 55/088* (2013.01); *B23H 9/003* (2013.01); *F16H 55/17* (2013.01)

(58) Field of Classification Search
CPC ....... F16H 55/088; B23H 9/003; B23H 55/17; B23H 5/06; B23H 5/08; B23F 7/00; B23F 5/02; B23P 15/14; B23P 23/02

USPC .......................................................... 451/47
See application file for complete search history.

(56) References Cited

U.S. PATENT DOCUMENTS

| | | | | |
|---|---|---|---|---|
| 3,467,593 A | | 9/1969 | Dickson et al. | |
| 3,499,830 A | | 3/1970 | Haggerty et al. | |
| 3,664,947 A | * | 5/1972 | Bass | B23H 11/003 204/224 M |
| 3,762,243 A | * | 10/1973 | Borrkfield | B23H 5/08 205/122 |
| 4,406,759 A | * | 9/1983 | Saitoh | B23H 9/08 205/646 |
| 4,761,867 A | * | 8/1988 | Vollmer | B21K 1/30 29/893.3 |

(Continued)

FOREIGN PATENT DOCUMENTS

| | | |
|---|---|---|
| DE | 102009011492 A1 | 9/2010 |
| DE | 102014214303 A1 | 1/2016 |

(Continued)

OTHER PUBLICATIONS

European Search Report for related EP Application No. 17154189. 9-1709, dated Jul. 21, 2017. 9 pages.

(Continued)

*Primary Examiner* — George B Nguyen
(74) *Attorney, Agent, or Firm* — Cantor Colburn LLP

(57) ABSTRACT

A method of manufacturing a gear is provided. The method includes forming a plurality of gear teeth in a surface of a gear, the gear teeth having tooth faces defining tooth edges including tooth edge flanks and tooth edge top land and generating a convex contour at an edge break of at least one of the tooth edge flanks and tooth edge top land.

18 Claims, 7 Drawing Sheets

(56) References Cited

U.S. PATENT DOCUMENTS

| | | | |
|---|---|---|---|
| 5,239,782 A * | 8/1993 | Lorenz | B23F 23/1218 |
| | | | 451/47 |
| 5,878,496 A * | 3/1999 | Liu | B21K 1/04 |
| | | | 148/906 |
| 6,077,150 A * | 6/2000 | Jankowski | B24B 53/075 |
| | | | 451/147 |
| 7,422,397 B2 | 9/2008 | Müller et al. | |
| 7,794,186 B2 | 9/2010 | Peiffer et al. | |
| 9,597,743 B2 * | 3/2017 | Bittner | B23H 5/06 |
| 2007/0144289 A1 | 6/2007 | O-Oka et al. | |
| 2015/0202705 A1 | 7/2015 | Bittner | |

FOREIGN PATENT DOCUMENTS

| | | |
|---|---|---|
| EP | 1243371 A1 | 9/2002 |
| EP | 1803974 A2 | 7/2007 |
| FR | 2072854 A5 | 9/1971 |
| JP | S492196 A | 1/1974 |
| JP | S5154388 U | 4/1976 |
| JP | S51157753 U | 12/1976 |
| JP | H0890339 A | 4/1996 |
| JP | 2000202719 A | 7/2000 |
| JP | 2003251428 A | 9/2003 |
| JP | 2008200785 A | 9/2008 |
| JP | 2009156449 A | 7/2009 |
| JP | 2009172736 A | 8/2009 |
| WO | 2008055275 A1 | 5/2008 |

OTHER PUBLICATIONS

French Patent No. 2072854;Date of Publication: Sep. 24, 1971; Machine Translation; 6 pages.

Japanese Patent No. 2000202719; Date of Publication: Jul. 7, 2000; Machine Translation; 5 pages.

Japanese Patent No. 2003251428; Date of Publication: Sep. 9, 2003; Machine Translation; 8 pages.

Japanese Patent No. 2008200785; Date of Publication: Sep. 4, 2008; Machine Translation; 10 pages.

Japanese Patent No. 2009156449; Date of Publication: Jul. 16, 2009; Machine Translation; 5 pages.

Japanese Patent No. 2009172736; Date of Publication: Aug. 6, 2009; Abstract Only; 1 page.

Japanese Patent No. H0890339; Date of Publication: Apr. 9, 1996; Abstract Only; 1 page.

Japanese Patent No. S492196; Date of Publication: Jan. 10, 1974; Machine Translation; 5 pages.

Japanese Patent No. S51157753; Date of Publication: Dec. 15, 1976; Machine Translation; 3 pages.

Japanese Patent No. S5154388; Date of Publication: Apr. 26, 1976; Machine Translation; 4 pages.

* cited by examiner

CONVEX GEAR TOOTH EDGE BREAK

CROSS REFERENCE TO RELATED APPLICATIONS

The present invention claims priority to U.S. Provisional Application Ser. No. 62/291,469, filed Feb. 4, 2016, the contents of which are incorporated herein by reference in their entirety.

BACKGROUND

The subject matter disclosed herein generally relates to gear tooth edge breaks and, more particularly, to formation of and gear teeth having convex edge breaks.

Gears are used in various industrial and technological applications to permit power transmission from one rotating or translating element to another. Each gear generally includes an array of gear teeth that mesh with the gear teeth of another gear so that the rotation or translation of the first gear can be transmitted to the second. The shapes of the gear teeth can be varied with some gear teeth being linearly shaped, some being helically shaped, others being provided as double-helical or herringbone shaped, and still others being provided as arcuate shaped (or C-Gear) gear teeth.

Gears typically have a radius or a chamfer on the end faces of gear teeth to eliminate sharp edges. Stress is typically concentrated at sharp edges. Thus, it is important to "break" the sharp edges of the teeth, thus forming tooth chamfer or corner radius. Conventionally, after hobbing, shaping, or grinding, the edge break of the tooth is performed as an additional operation on a standalone, mechanically controlled machine. These machines typically do not produce a sufficiently smooth finish because a spinning grinding wheel is typically guided over the edges of the gear teeth as the gear is rotated on a turntable. These machines may be able to produce a rough approximation of a 45 degree chamfer at the tooth edge. Further, the machines traditionally used are not programmable or computer numerically controlled (CNC). This necessitates a manual touch-up to finish any rough or missed areas at the tooth edge break.

BRIEF DESCRIPTION

According to one embodiment, a method of manufacturing a gear is provided. The method includes forming a plurality of gear teeth in a surface of a gear, the gear teeth having tooth faces defining tooth edges including tooth edge flanks and tooth edge top land and generating a convex contour at an edge break of at least one of the tooth edge flanks and tooth edge top land.

In addition to one or more of the features described above, or as an alternative, further embodiments may include hardening the gear.

In addition to one or more of the features described above, or as an alternative, further embodiments may include finishing surfaces of the gear.

In addition to one or more of the features described above, or as an alternative, further embodiments may include that the generating includes a multi-axis movement of a machine to form the convex contour.

In addition to one or more of the features described above, or as an alternative, further embodiments may include that the generating includes using an electrochemical grinding machine.

In addition to one or more of the features described above, or as an alternative, further embodiments may include that the convex contour is one of curved, tangential, pointed, radiused, and smooth In addition to one or more of the features described above, or as an alternative, further embodiments may include that the convex contour is a radial curve that is tangent to a gear tooth flank.

In addition to one or more of the features described above, or as an alternative, further embodiments may include that the gear teeth are splines.

In addition to one or more of the features described above, or as an alternative, further embodiments may include that a same tool is employed for forming the plurality of gear teeth in the surface of the gear and for generating the convex contour at the edge break of the at least one of the tooth edge flanks and tooth edge top land.

According to another embodiment, a gear is provided. The gear includes an end face and a plurality of gear teeth, the gear teeth having tooth faces defining tooth edges including tooth edge flanks and tooth edge top land. At least one of the tooth edge flanks and the tooth edge top land includes a tooth edge break with a convex contour.

In addition to one or more of the features described above, or as an alternative, further embodiments may include that both the tooth edge flanks and the tooth edge top land have a convex contour.

In addition to one or more of the features described above, or as an alternative, further embodiments may include that the convex contour is one of curved, tangential, pointed, radiused, and smooth.

In addition to one or more of the features described above, or as an alternative, further embodiments may include that the convex contour is a radial curve that is tangent to a gear tooth flank.

In addition to one or more of the features described above, or as an alternative, further embodiments may include that the gear teeth are splines.

Technical effects of embodiments of the present disclosure include providing a smooth edge break to gear teeth. Further technical effects include a convex, radiused, or tangential edge break on end faces of gear teeth.

BRIEF DESCRIPTION OF THE DRAWINGS

The subject matter disclosed herein is particularly pointed out and distinctly claimed in the claims at the conclusion of the specification. The foregoing and other features and advantages of embodiments disclosed herein are apparent from the following detailed description taken in conjunction with the accompanying drawings in which:

DETAILED DESCRIPTION

Figure 1:
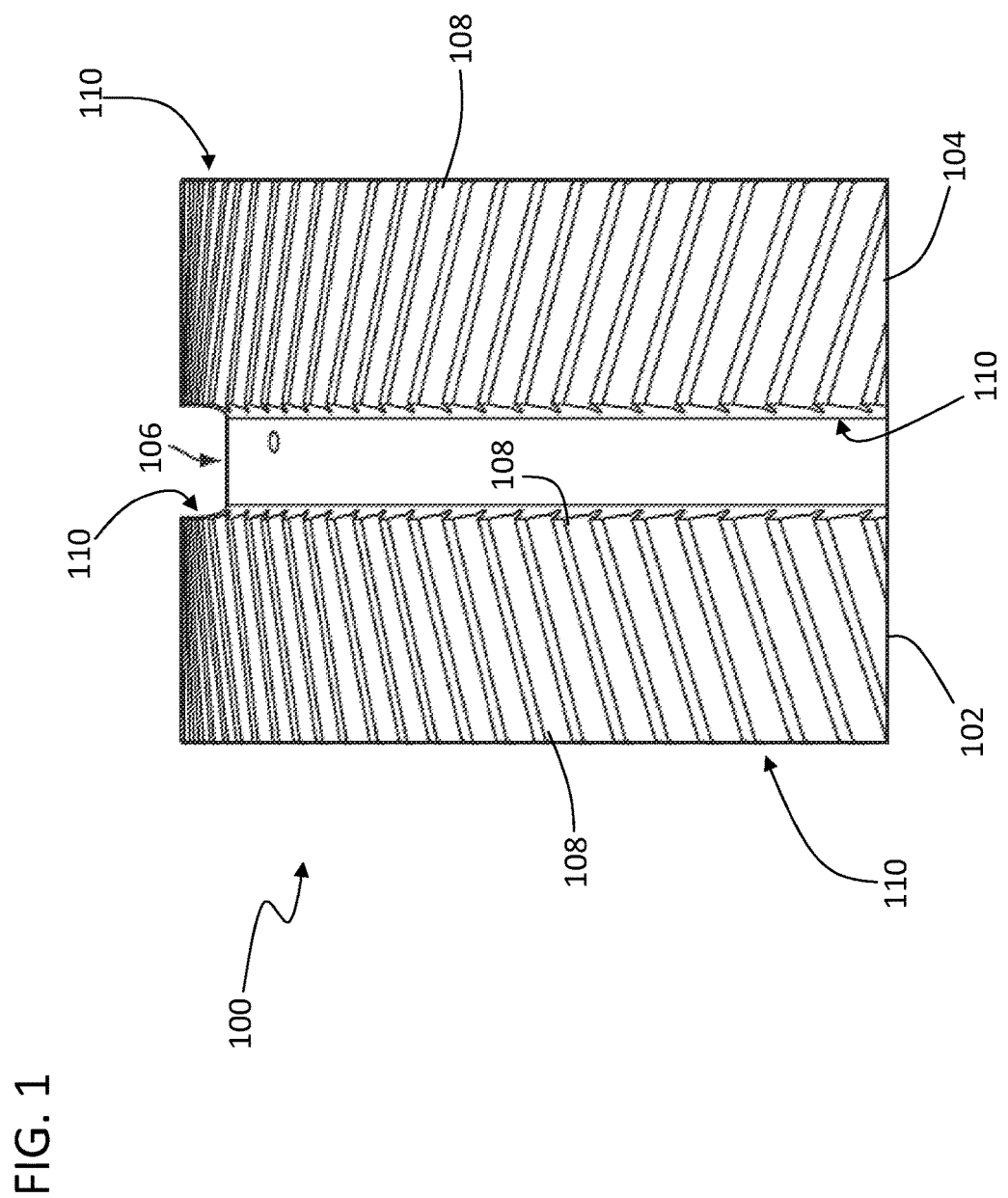
FIG. 1 is an illustration of a circumferential view of a double helical gear with an apex gap.

With reference to FIG. 1, an example of a gear, such as a double helical gear, is shown. The gear 100 includes a first side 102 having a helical gear pattern of a first hand, a second side 104 having a helical gear pattern of a second hand opposite the first hand, and an apex gap 106 defined axially between the first side 102 and the second side 104. The gear 100 may have a relatively high gear contact ratio owing to the presence of the helical gear patterns of the first side 102 and the second side 104. As a result, a gear mesh of the gear 100 exhibits increased strength and reduced noise signature as compared to that of a straight spur gear, or other types of gears. The apex gap 106 is formed as a result of processes used to shape and precision grind the gear flanks and roots of the gear teeth 108.

The teeth 108 have tooth faces 110 that are formed on the exterior facing portions of first side 102 and the second side 104, and on the interior facing portions of the first side 102 and the second side 104. That is, there are tooth faces on the exterior of the gear 100 and flanking the apex gap 106. Those of skill in the art will appreciate that gear 100 is merely presented for exemplary purposes and other types of gear may be formed, having tooth faces, without departing from the scope of the present disclosure. The teeth 108 have and define tooth faces 110 and this is where sharp edges are formed. Due to the sharp edges, stress concentrations are formed, and fatigue to the teeth may result.

Although shown in FIG. 1 with a specific example of a gear, those of skill in the art will appreciate that the methods, processes, and gears used and formed herein may be any type of gear. The gear 100 of FIG. 1 is provided merely for example and explanatory purposes. Other gears may include, but are not limited to, helical, double-helical, herringbone, spur, or any other type of gear.

As used herein, a gear grinding machine is employed that may incorporate the use of a high speed grinding spindle. Electrochemical grinding ("ECG"), and super abrasives, such as cubic boron nitride ("CBN"), may be utilized in a creep feed, deep cut, grinding process allowing for almost any conceivable gear design. The gear grinding machine may be able to generate, in some embodiments, hyper smooth ground surfaces of less than 1 micro inch Ra, burr free edges, with low heat generation and may include the ability to grind exotic high hardness conductive materials. ECG allows for a very small grinding wheel with extremely low tool wear.

Figure 2A:
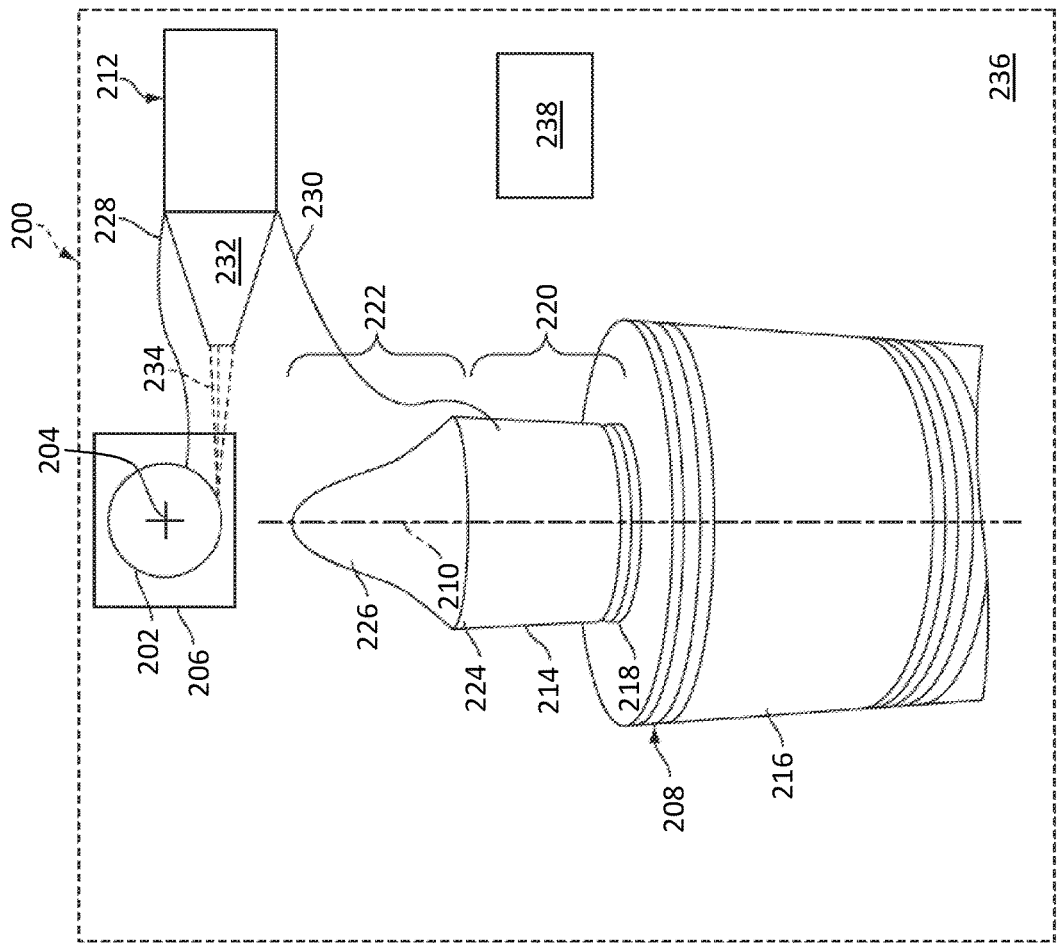
FIG. 2A is a schematic illustration of a machine for machining a gear in accordance with embodiments.
Figure 2B:
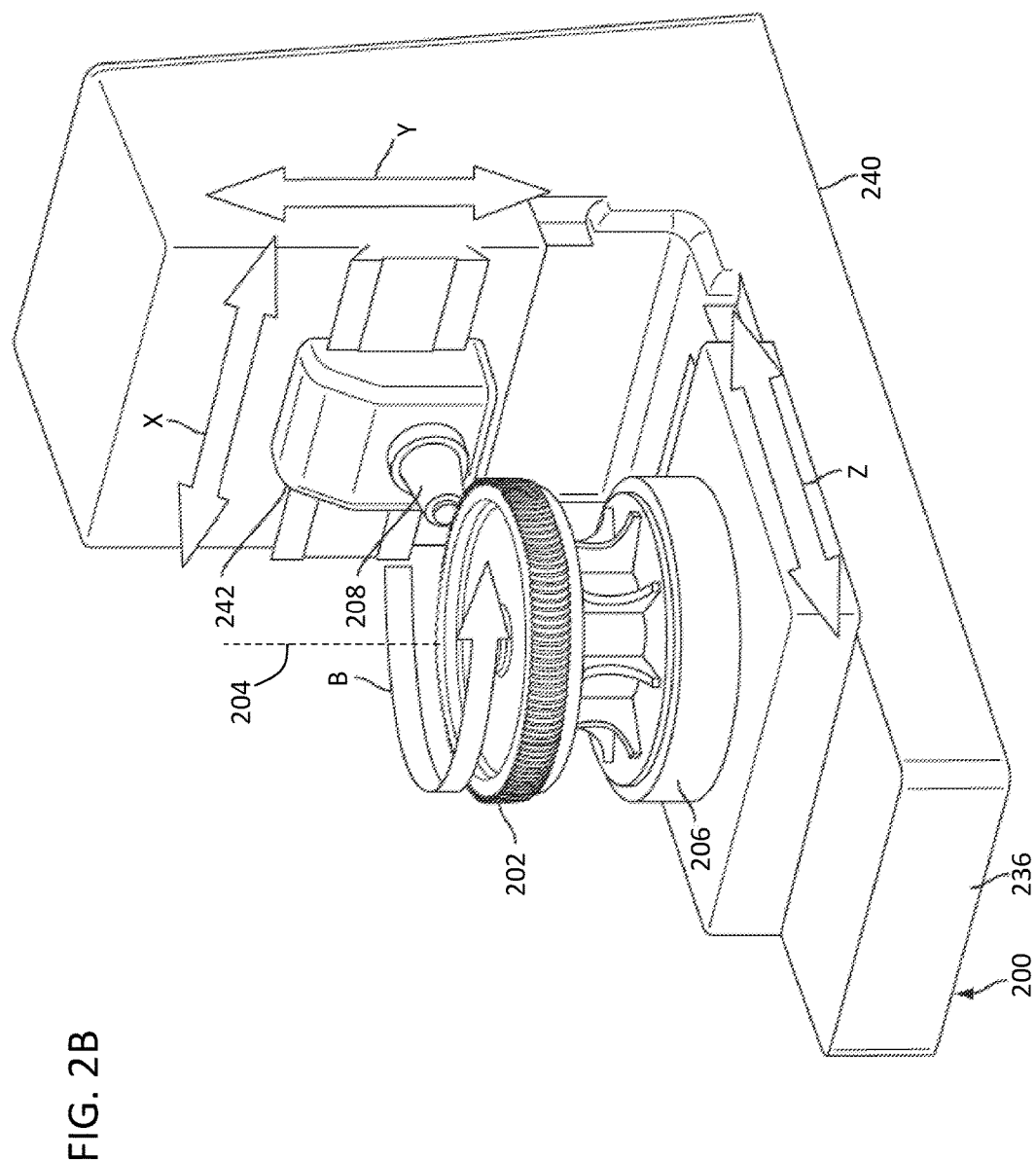
FIG. 2B is a perspective view of the machine for machining a gear shown in FIG. 2A.

With reference to FIGS. 2A and 2B, a machine 200 is provided for machining a work piece 202. The work piece 202 may have a substantially cylindrical initial shape with a first central longitudinal axis 204. The machine 200 includes a chuck or fixture 206 on which the work piece 202 may be disposed, and a grinding spindle 208. The grinding spindle 208 is configured to remove material from the work piece 202. The grinding spindle 208 defines an elongate shape with a second central longitudinal axis 210. The grinding spindle 208 may be disposed relative to the chuck 206 and the work piece 202 such that the first longitudinal axis 204 and second central longitudinal axis 210 may or may not intersect one another. The machine 200 further includes an electrochemical grinding (ECG) element 212, which is configured to execute ECG processing on the grinding spindle 208 and the work piece 202.

As shown in FIG. 2A, the grinding spindle 208 may include a wheel 214, a spindle body 216, and an insulator 218. The wheel 214 is configured or disposed to be rotatable about the second central longitudinal axis 210 of the grinding spindle 208 and, as shown, includes a main wheel portion 220, which extends axially outwardly from an end of the spindle body 216, and a tip portion 222 defined at a distal end 224 of the main wheel portion 220 and defining a tip 226. In some embodiments, abrasive may be attached or formed about the tip 226 of the tip portion 222. The spindle body 216 is disposed to drive rotation of the wheel 214 about the second central longitudinal axis 210 of the grinding spindle 208. The insulator 218 is disposed and configured to electrically insulate the wheel 214 from the spindle body 216.

In accordance with embodiments, the abrasive may be a super abrasive, such as cubic boron nitride (CBN), diamond, etc. In some embodiments, the tip 226 may be substantially pencil-shaped, substantially conical, or may have an involute profile, although other profiles and shapes are considered. In embodiments having an involute profile, an outer surface of the tip 226 may curve inwardly from an edge of the main wheel portion 220 with a radius of curvature that decreases with increasing axial distance from the edge of the main wheel portion 220. At the axial end of the tip 226, the radius of curvature may flip direction such that the end-most portion of the tip 226 has a blunt, rounded surface.

The ECG element 212 includes a first electrical lead 228, a second electrical lead 230 and a dispenser 232. The first electrical lead 228 is configured to positively charge the work piece (anode) 202, the second electrical lead 230 is configured to negatively charge the grinding spindle (cathode) 208, and the dispenser 232 is configured to dispense electrolytic fluid 234 toward the work piece 202. The opposite electrical charging of the work piece 202 and the grinding spindle 208 in combination with the dispensation or application of the electrolytic fluid 234 toward the work piece 202 causes a material of the work piece 202 to soften. The softening of the work piece material enables the grinding spindle 208 to remove material from the work piece 202. In some embodiments, the softening facilitates removal of material from the work piece 202 by the grinding spindle to a desired depth in only a single pass and more rapidly than could be done without the softening.

The machine 200 further includes a machine body 236 and a controller 238. In some embodiments, and as shown in FIG. 2B, the machine body 236 may be provided, for example, as one or more support structures 240 and robotic arms 242 that are coupled to one or more of the chuck 206, the grinding spindle 208, and the ECG element 212 to position the various elements with respect to one another for grinding internal or external gears, such as work piece 202. The controller 238 may be provided as a computer numerical control (CNC) element. Where the controller 238 is provided as a CNC element, the machine body 236 is formed to define four axes (e.g., rotational axis B and spatial axes X, Y, Z, as shown in FIG. 2B) and is capable of performing multi-axis synchronous motion. The axes may include a rotary axis B for indexing the work piece 202, a vertical axis Y running parallel to the first central longitudinal axis 204 of the work piece 202 (i.e., a cutter path), a horizontal axis X for centrality adjustments between the wheel 214 of the grinding spindle 208 and the work piece 202 and a fore and aft axis Z to control a cutting depth of the grinding spindle 208. In accordance with some embodiments, the ECG element 212 may be integral with the machine body 236 and the controller 238. Alternatively, the ECG element 212 may be formed and configured separately from the machine body 236 and/or the controller 238.

Figure 3:
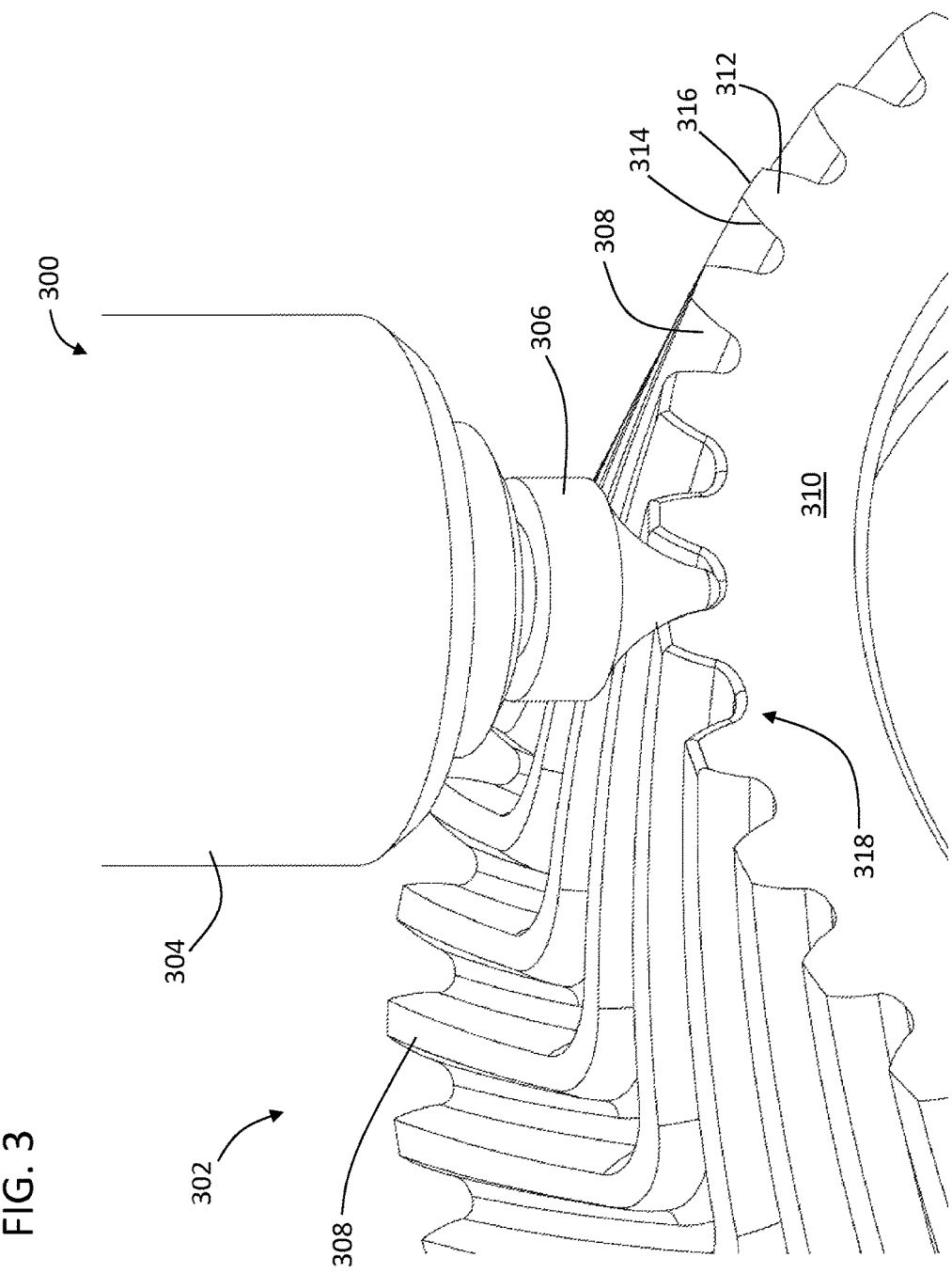
FIG. 3 is exemplary embodiment of a tool applied to a gear tooth edge to form a convex edge break in accordance with embodiments of the disclosure.

Although shown and described with respect to a specific ECG machine, those of skill in the art will appreciate that the processes and methods described herein may be performed with other machines and/or configurations, or variations thereof Turning now to FIG. 3, an exemplary embodiment of a grinding spindle and tip (tool 300) applied to a gear tooth edge is shown. Tool 300 may be configured similarly to the machine 200 described with respect to FIGS. 2A and 2B, and may be configured to perform electrochemical grinding to form the tooth edge break of gear 302.

As shown, tool 300 includes a spindle body 304 and a tip 306. The tip 306 is configured to electrochemically grind or remove material from the gear 302. During production or formation of the gear 302, the tip 306 is operated to remove material of the gear 302 to form gear teeth 308. The gear 302 includes an end face 310, and at the end face 310 the teeth 308 have tooth faces 312 defining tooth edges including tooth edge flanks 314 and tooth edge top land 316.

During operation of the tool 300 to form the teeth 308 and particularly form the edge break of the teeth 308 at the end face 310, the tip 306 may be used to form a convex edge break 318. That is, the edge break of the tooth edge flanks 314, as shown, may be formed with a convex (e.g., curved, tangential cut, pointed, radiused, and/or smooth) contour. This is in contrast to the prior art concave edge breaks, as shown in FIG. 4A.

To achieve the convex edge break 318, during operation, when the tip 306 reaches the end face 310, a multi-axis motion may be executed. The multi-axis motion may be enabled by a machine similar to machine 200 of FIGS. 2A and 2B, and for example, employing the rotational axis B and spatial axes X, Y, Z as shown in FIG. 2B.

Figure 4A:
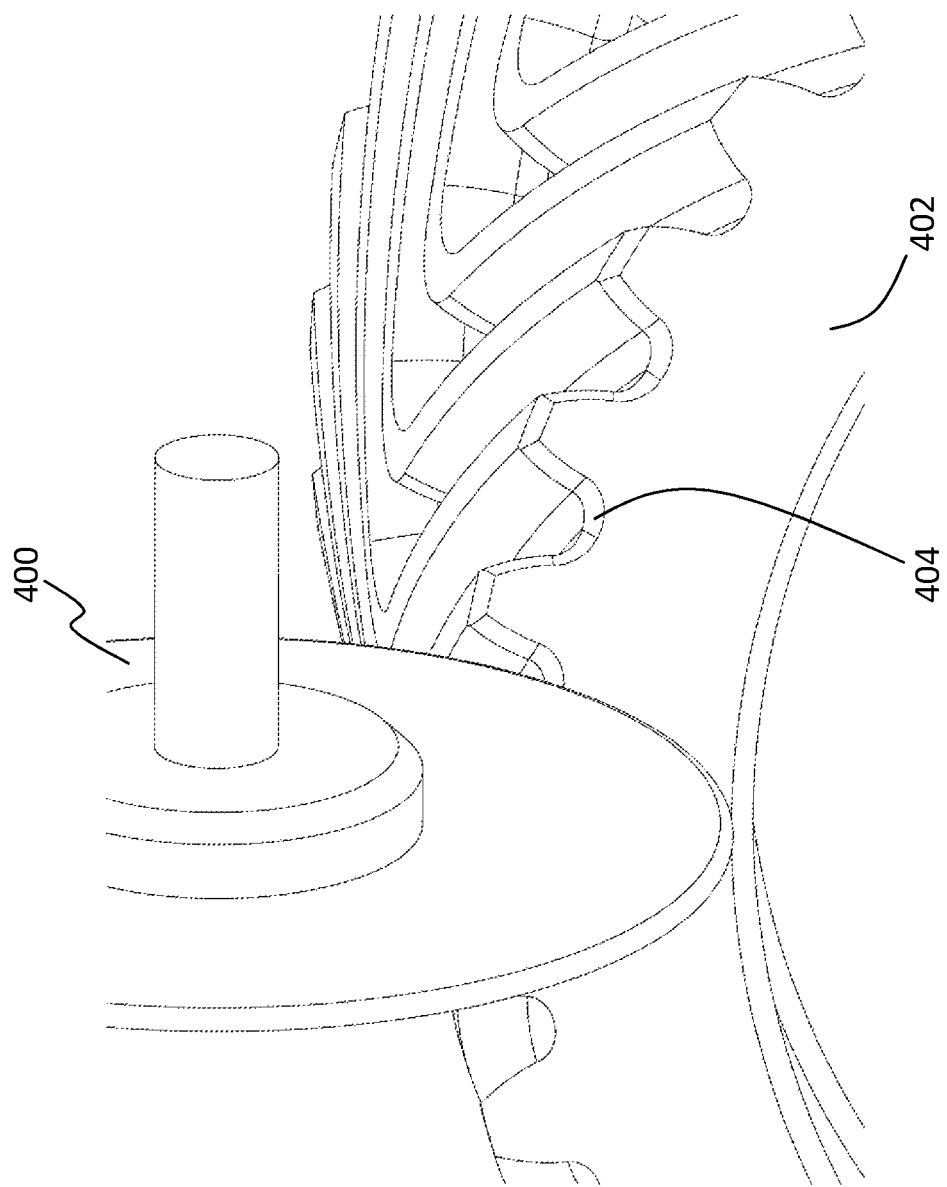
FIG. 4A is a schematic view of a tooth edge break and formation thereof in accordance with the prior art.
Figure 4B:
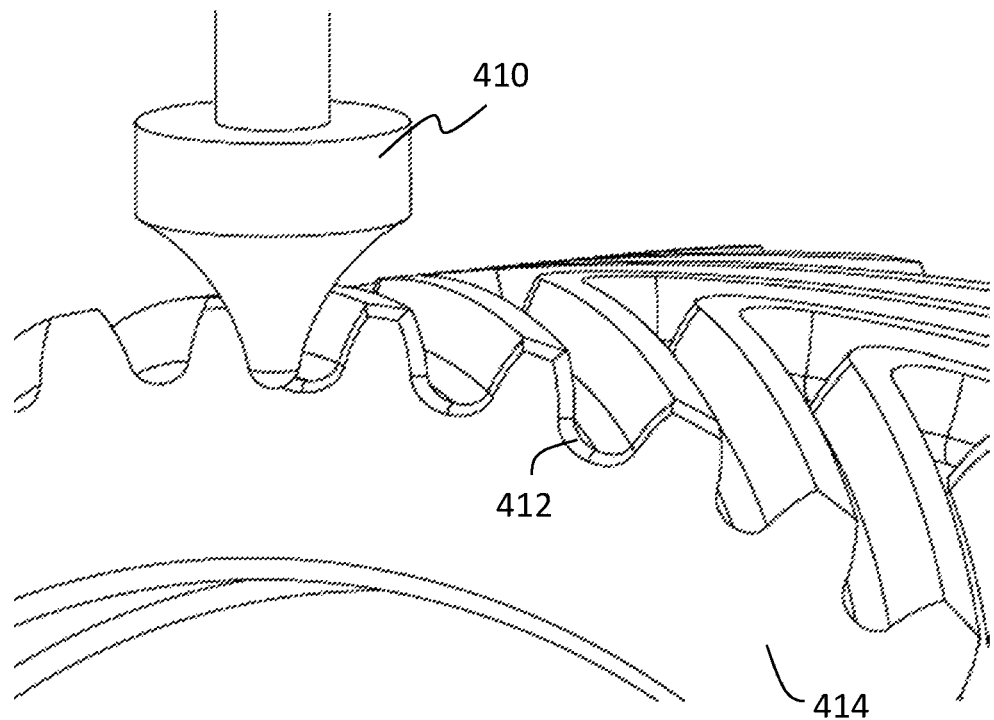
FIG. 4B is a schematic view of a tooth edge break and formation thereof formed in accordance with exemplary embodiments of the disclosure.
Figure 4C:
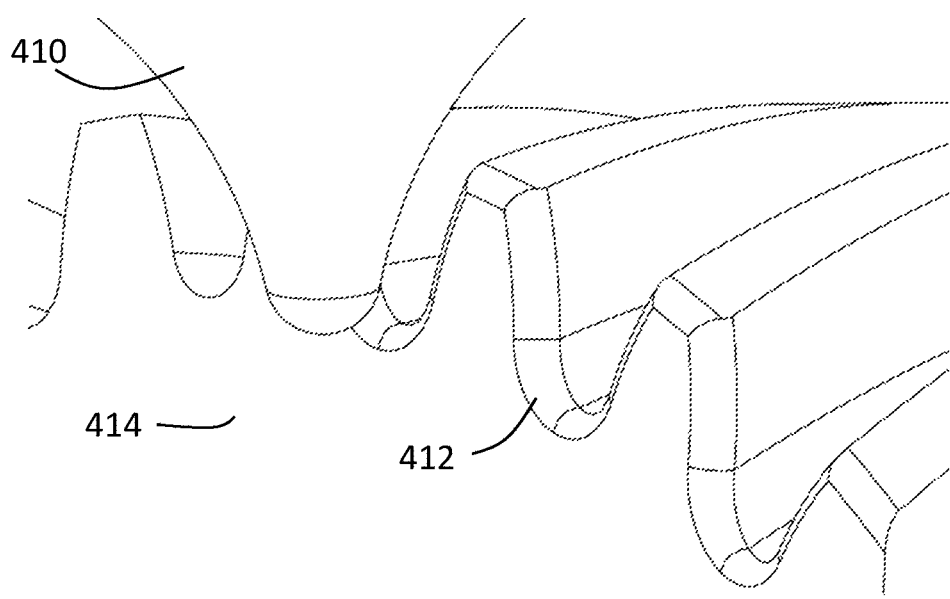
FIG. 4C is an alternative schematic view of a tooth edge break as shown in FIG. 4B.

Turning now to FIGS. 4A-4C, a comparison between the prior art edge break and an edge break in accordance with an exemplary embodiment of the present disclosure is shown. FIG. 4A shows the formation and shape of an edge break formed on gear teeth by a disk grinder. FIG. 4B shows the formation and shape of an edge break formed on gear teeth as formed in accordance with embodiments disclosed herein. FIG. 4C shows a more detailed view of the edge break shown in FIG. 4B.

As shown in FIG. 4A a grinding disk 400 is used to cut or grind end faces of teeth of a gear 402. The end faces of the teeth of the gear 402 are formed with a somewhat concave chamfer 404 on end faces of the gear teeth.

In contrast, as shown in FIGS. 4B and 4C, a grinding point 410 having composite machine motion can form a convex edge 412 on the end faces of teeth of gear 414. The convex edge 412 may be curved, tangential cut, pointed, radiused, and/or smooth, but in all embodiments extends outward from the surfaces of the teeth, rather than inward, as in the prior grinding-formed edge breaks shown, e.g., in FIG. 4A.

Figure 5:
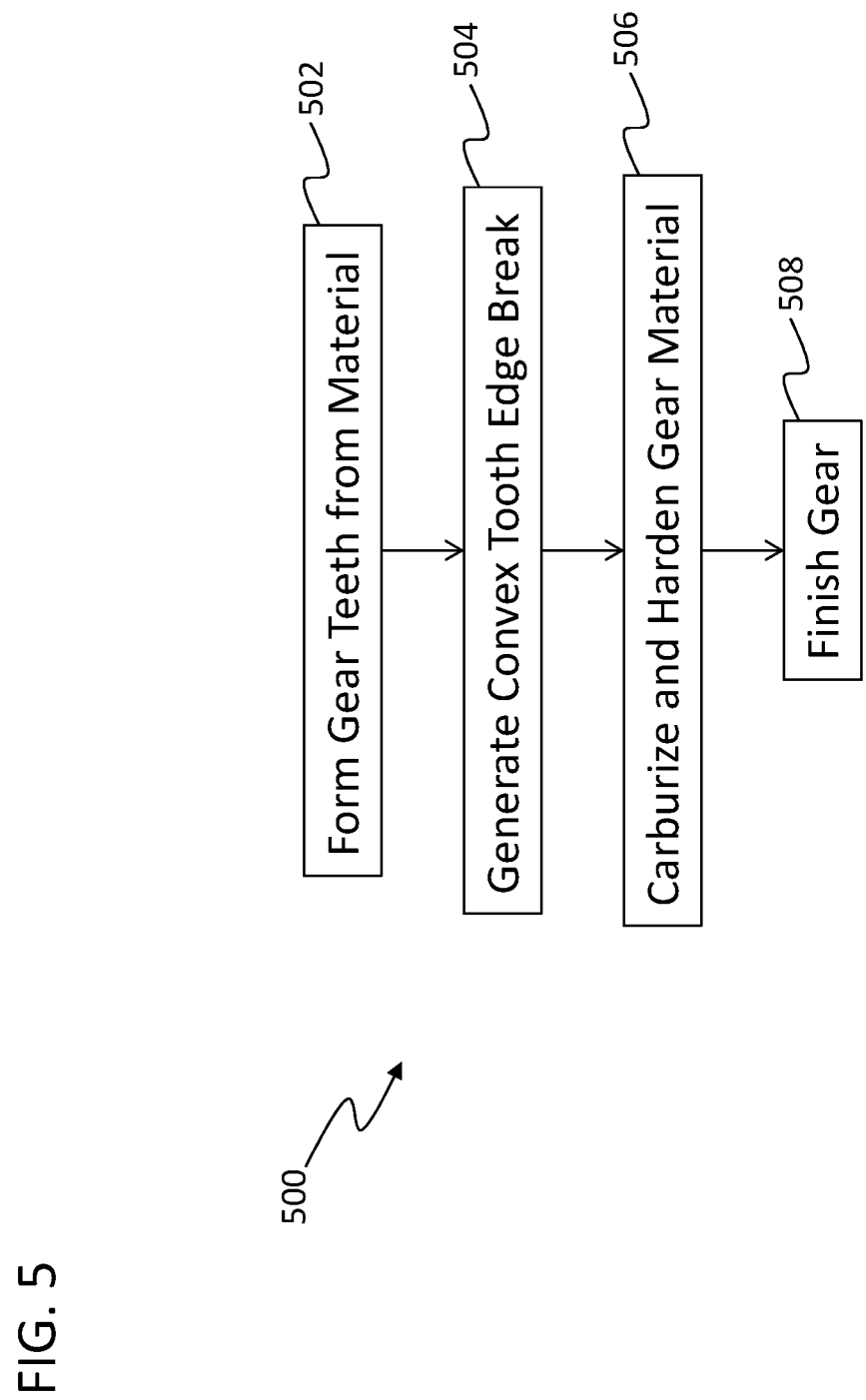
FIG. 5 is a gear formation process in accordance with exemplary embodiments of the disclosure.

Turning now to FIG. 5, a process 500 of forming a convex edge break in accordance with an exemplary embodiment of the present disclosure is shown. As shown, a method of machining gear teeth such as the gear teeth described above is provided. Further, the process 500 may be used to form edge breaks of splines or other edge break surfaces on gears.

As shown in FIG. 5, the method first includes a grinding of the gear teeth from a solid, such as a work piece, using an ECG machine, such as the ECG grinding machine and process described above (operation 502). As the ECG is performed at operation 502, a convex edge break operation is performed to form a convex edge break at the end of the teeth of the gear (operation 504). During operation 504, the machine is operated with a multi-axis movement or motion to produce a convex tooth edge break. For example, a tip of an ECG machine may be configured to move tangentially outward from an axis of a tooth gap. This may form a radiused edge break, such as shown in FIGS. 4B and 4C.

Once operations 502 and 504 are fully or partially completed, the method further includes a hardening of the work piece (operation 506) and an optional finishing grind of the gear teeth using the ECG machine and process described above (operation 508). Of course, it will be understood that the ECG grinding method 500 need not be limited to the ECG grinding methods and machines described above and can be replaced by any ECG grinding method, process, and/or machine designed to form any tooth shape, geometry, and/or configuration (e.g., a tooth shape that is reflective of the tip of the grinding spindle having an involute profile, e.g., splines).

Advantageously, embodiments of the present disclosure provide a gear tooth having convex edge breaks that are created with a contour with a radius that is tangent to a gear tooth flank. The convex contour enables the removal of stress concentrations on the gear teeth, thus prolonging gear life.

Further, in accordance with embodiments disclosed herein, advantageously, methods and processes described herein enable the elimination of various steps used in prior processes for forming gears. For example, a separate tooth edge break grinding process may be eliminated because the formation of the tooth edge break in accordance with embodiments disclosed herein may be performed with the same tool that is used to form the teeth. Moreover, a manual operation for finishing any rough or missed areas may be eliminated by embodiments disclosed herein.

Furthermore, advantageously, because the gear formation may use an electrochemical grinding process, a computer numerically controlled machine may be used, allowing for complex multi-axis motions. These motions may thus enable the formation of convex tooth edge breaks as shown and described herein.

While embodiments disclosed herein have been described in detail in connection with only a limited number of embodiments, it should be readily understood that the disclosure is not limited to such disclosed embodiments. Rather, embodiments of the present disclosure can be modified to incorporate any number of variations, alterations, substitutions, combination, sub-combination, or equivalent arrangements not heretofore described, but which are commensurate with the spirit and scope of the disclosure. Additionally, while various embodiments of the disclosure have been described, it is to be understood that aspects of the disclosure may include only some of the described embodiments.

For example, although described herein with respect to one particular application and operation of electrochemical grinding, other ECG processes and operations may be employed to achieve the same result, and thus the disclosure is not limited by the above described example. Further, although shown and described with a limited number of types of gears, those of skill in the art will appreciate that the methods, processes, and gears used and formed herein may be any type of gear. For example, other gears may include, but are not limited to, helical, double-helical, herringbone, spur, or any other type of gear. Further, other types of gear surfaces with edge breaks are contemplated, such as splines, the surfaces on the interior of a gap, etc. Furthermore, although an illustrative machine is shown and described herein, those of skill in the art will appreciate that other types of machines or configurations may be implemented to form the edge breaks of gear surfaces, as detailed herein. Thus, the processes and methods described herein are not limited to the type of gear and/or machine that has been described above.

Accordingly, the disclosure is not to be seen as limited by the foregoing description, but is only limited by the scope of the appended claims.

What is claimed is:

1. A method of manufacturing a gear, the method comprising:

forming a plurality of gear teeth in a surface of a gear, the gear teeth having tooth faces defining tooth edges including tooth edge flanks and tooth edge top land; and generating a convex contour at an edge break of at least one of the tooth edge flanks and tooth edge top land;

wherein a same tool is employed for forming the plurality of gear teeth in the surface of the gear and for generating the convex contour at the edge break of the at least one of the tooth edge flanks and tooth edge top land.

2. The method of claim 1, further comprising hardening the gear.

3. The method of claim 1, further comprising finishing surfaces of the gear.

4. The method of claim 1, wherein the generating comprises a multi-axis movement of a machine to form the convex contour.

5. The method of claim 1, wherein the generating comprises using an electrochemical grinding machine.

6. The method of claim 1, wherein the convex contour is one of curved, tangential, pointed, radiused, and smooth.

7. The method of claim 1, wherein the convex contour is a radial curve that is tangent to a gear tooth flank.

8. The method of claim 1, wherein the gear teeth are splines.

9. The method of claim 1, wherein the surface of the gear is an end face of the gear.

10. The method of claim 1, wherein both the tooth edge flanks and the tooth edge top land have a convex contour.

11. The method of claim 1, wherein generating the convex contour includes using an electrochemical grinding machine to form the convex contour.

12. The method of claim 11, wherein forming the plurality of gear teeth in the surface of the gear includes using the electrochemical grinding machine to form the plurality of gear teeth in the surface of the gear.

13. The method of claim 12, wherein generating the convex contour includes using a tip of a tip portion of a grinding spindle of the electrochemical grinding machine to generate the convex contour.

14. The method of claim 12, wherein the convex contour is generated by a multi-axis movement of the electrochemical grinding machine that forms the convex contour.

15. The method of claim 11, wherein the electrochemical grinding machine includes a grinding spindle, abrasive for removing material from the gear is attached or formed about a tip of a tip portion of the grinding spindle, and the machine has three spatial axes and one rotational axis to move the grinding spindle and turn the gear.

16. The method of claim 1, wherein the convex contour is tip-grinded and generated by a multi-axis movement of an electrochemical grinding machine that forms the convex contour, and the machine additionally forms the plurality of gear teeth in the surface of the gear.

17. A gear manufactured by the method of claim 1.

18. The method of claim 1, wherein the tool includes a grinding spindle having a tip, the tip is operated to remove material of the gear to form the gear teeth, and the tip is used to form the convex edge break.

* * * * *